(12) United States Patent
Kakubashi

(10) Patent No.: US 8,059,940 B2
(45) Date of Patent: Nov. 15, 2011

(54) BROADCAST RECEIVING APPARATUS AND BROADCAST RECEIVING METHOD

(75) Inventor: Takahiro Kakubashi, Isesaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 29 days.

(21) Appl. No.: 12/609,966

(22) Filed: Oct. 30, 2009

(65) Prior Publication Data

US 2010/0226625 A1    Sep. 9, 2010

(30) Foreign Application Priority Data

Mar. 9, 2009 (JP) ................................ 2009-055009

(51) Int. Cl.
- H04N 5/78 (2006.01)
- H04N 5/50 (2006.01)
- H04N 5/76 (2006.01)
- H04N 5/92 (2006.01)
- H04N 5/93 (2006.01)
- H04N 5/445 (2011.01)
- H04N 7/00 (2011.01)
- H04N 7/16 (2011.01)
- H04N 7/173 (2011.01)
- G06F 17/00 (2006.01)

(52) U.S. Cl. ........ 386/324; 386/239; 386/248; 386/294; 386/298; 386/323; 386/326; 386/353; 348/473; 348/569; 348/738; 715/201; 725/58; 725/109; 725/110; 725/112; 725/115; 725/135

(58) Field of Classification Search .................. 386/324, 386/239, 248, 294, 298, 323, 326, 353, E5.001, 386/E5.002, E5.003, E5.025, E5.043; 348/473, 348/569, 738, E5.007, E5.096, E5.101, E5.104, 348/E5.105, E5.108, E7.035, E7.036, E7.071; 715/201; 725/58, 109, 110, 112, 115, 135

See application file for complete search history.

(56) References Cited

U.S. PATENT DOCUMENTS

| 6,871,234 | B1 | 3/2005 | Minakuchi et al. | |
|---|---|---|---|---|
| 2005/0010959 | A1* | 1/2005 | Kitamura | 725/115 |
| 2005/0128351 | A1* | 6/2005 | Yamamoto et al. | 348/473 |

(Continued)

FOREIGN PATENT DOCUMENTS

JP    2001-054094    2/2001

(Continued)

OTHER PUBLICATIONS

English Translation of the Japanese "Notification of Reasons for Rejection," mailed Jan. 12, 2010.

*Primary Examiner* — Thai Tran
*Assistant Examiner* — Syed Hasan
(74) *Attorney, Agent, or Firm* — Blakely, Sokoloff, Taylor & Zafman LLP

(57) ABSTRACT

According to one embodiment, a broadcast receiving apparatus includes a receiving module configured to receive a broadcast signal; a storage configured to store audio files and video files; a reading module configured to determine whether the broadcast signal received is an audio signal or a video signal, and to read a video file or an audio file from the storage according to a result of determination; and a playing back module configured to play back audio and video on the basis of the broadcast signal and one of the video file and the audio file read by the reading module.

5 Claims, 4 Drawing Sheets

U.S. PATENT DOCUMENTS

2005/0280744 A1* 12/2005 Shin .............................. 348/738
2006/0251388 A1* 11/2006 Taya et al. ...................... 386/83
2007/0003216 A1* 1/2007 Iketo .............................. 386/83
2009/0177299 A1 7/2009 Van De Sluis et al.

FOREIGN PATENT DOCUMENTS

| JP | 2001-339679 | 12/2001 |
| JP | 2004-040579 | 2/2004 |
| JP | 2006-101391 | 4/2006 |
| JP | 2008-521327 | 6/2008 |

* cited by examiner

| No | File Name | GENRE A | GENRE B |
|---|---|---|---|
| 1 | AAA.jpg | GAME | MUSIC |
| 2 | BBB.jpg | NEWS | ECONOMY |
| 3 | CCC.bmp | ECONOMY | SPORT |
| 4 | DDD.gif | LEISURE | DRAMA |
| 5 | EEE.bmp | SPORT | ANIMATION |

VIDEO FILE SETTING SCREEN

| No | File Name | GENRE A | GENRE B |
|---|---|---|---|
| 1 | FFF.mp3 | GAME | MUSIC |
| 2 | GGG.mp3 | NEWS | ECONOMY |
| 3 | HHH.wav | ECONOMY | SPORT |
| 4 | JJJ.mp3 | LEISURE | DRAMA |
| 5 | KKK.wav | SPORT | ANIMATION |

AUDIO FILE SETTING SCREEN

BROADCAST RECEIVING APPARATUS AND BROADCAST RECEIVING METHOD

CROSS-REFERENCE TO RELATED APPLICATIONS

This application is based upon and claims the benefit of priority from Japanese Patent Application No. 2009-055009, filed Mar. 9, 2009, the entire contents of which are incorporated herein by reference.

BACKGROUND

1. Field

One embodiment of the invention relates to a broadcast receiving apparatus and a broadcast receiving method.

2. Description of the Related Art

Among conventional broadcast receiving apparatus are ones in which the audio setting is changed according to the genre of a broadcast program being viewed (refer to JPA-2006-101391, for example).

However, the above conventional broadcast receiving apparatus do not accommodate a case of receiving a broadcast containing only video or audio.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention, a broadcast receiving apparatus includes: a receiving module configured to receive a broadcast signal; a storage configured to store audio files and video files; a reading module configured to determine whether the broadcast signal received is an audio signal or a video signal, and to read a video file or an audio file from the storage according to a result of determination; and a playing back module configured to play back audio and video on the basis of the broadcast signal and one of the video file and the audio file read by the reading module.

First Embodiment

Figure 1:
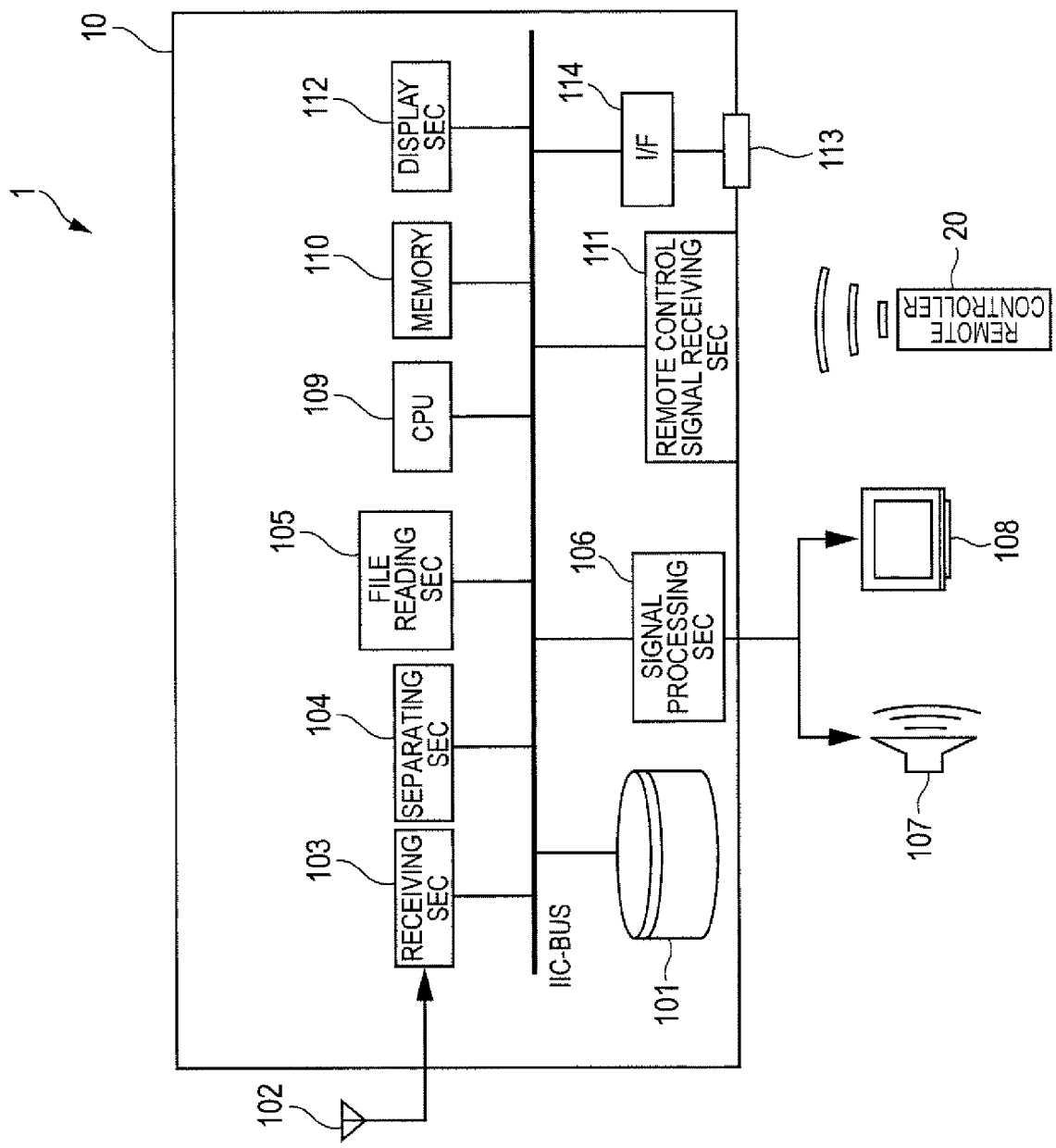
FIG. 1 shows an exemplified configuration of a broadcast receiving apparatus according to a first embodiment.
Figures 2, 3:
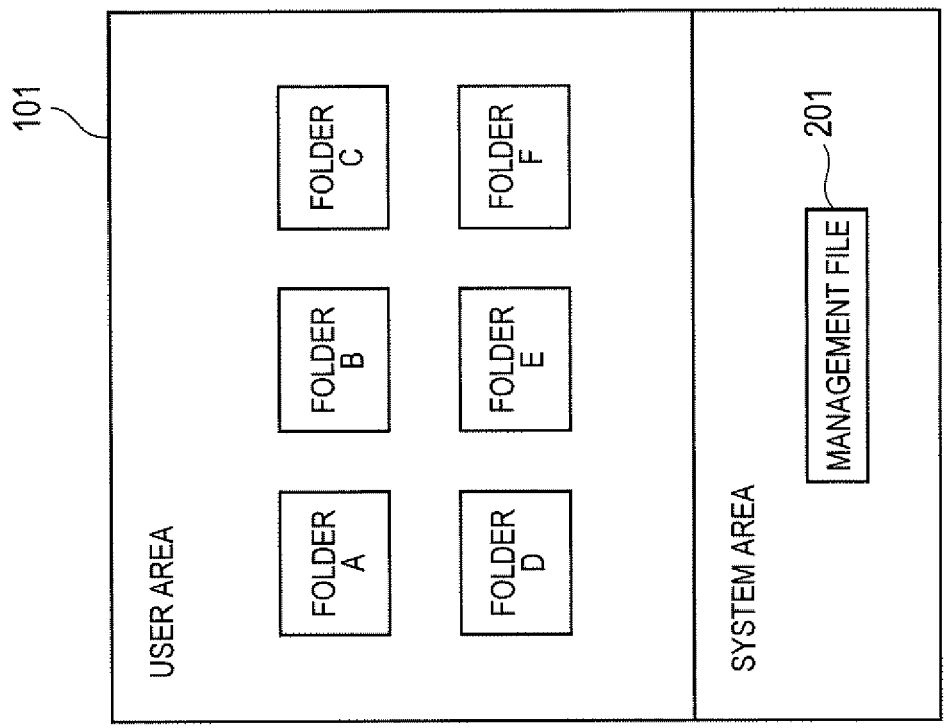
FIG. 2 shows exemplified data which is stored in an HDD.
FIG. 3 shows an exemplified management file which is stored in the HDD.

FIG. 1 shows an exemplified configuration of a broadcast receiving apparatus 1 according to a first embodiment. FIG. 2 shows exemplified data which is stored in an HDD. FIG. 3 shows table data.

In digital broadcast, in many cases a broadcast contains only audio in the case where the service type is "radio." On the other hand, in many cases a broadcast contains only video in the case where the service type is "data" "teletext," or the like.

The broadcast receiving apparatus 1 according to the first embodiment is intended to increase the convenience of the user by playing back a video file or audio file stored in advance in viewing or listening to a broadcast containing only audio or video. The configuration of the broadcast receiving apparatus 1 according to the first embodiment will be hereinafter described with reference to FIGS. 1-3.

(Configuration of Broadcast Receiving Apparatus 1)

As shown in FIG. 1, the broadcast receiving apparatus 1 according to the first embodiment is configured in such a manner that an antenna 102, speakers 107, and a monitor 108 are connected to an STB (set-top box) 10.

The set-top box 10 is equipped with an HDD 101, a receiving section 103, a separating section 104, a file reading section 105 (reading section), a signal processing section 106 (playing back section), a CPU 109, a memory 110, a remote control signal receiving section 111 (instruction accepting section), a display section, a terminal 113, and an interface (I/F) 114.

The HDD (hard disk drive) 101 is a storage device for storing video files, audio files, etc. Instead of the HDD 101, another storage device such as an SSD (solid-state drive) which uses a flash memory may be used.

As shown in FIG. 2, the storage area of the HDD 101 is logically divided into a system area and a user area. In the user area, video files and audio files are stored so as to be placed in folders A-F according to their genres and file types (i.e., whether they are a video file or an audio file). The video file includes an image file.

A management file 201 of the folders A-F stored in the user area is stored in the system area. FIG. 3 shows the details of the management file 201. The management file 201 is table data in which file types and genres are correlated with the respective folders A-F stored in the user area. For example, folder A is correlated with a type "video" and a genre "news" and hence it is seen that video files relating to news are placed in folder A.

The antenna 102 receives digital broadcast signals which are transmitted from broadcasting stations. The digital receiving section 103 tunes in to a desired channel and thereby selects a corresponding digital broadcast signal received by the antenna 102. The digital receiving section 103 demodulates the selected digital broadcast signal and generates a TS (transport stream).

The separating section 104 separates a broadcast signal (audio ES (audio signal) and/or video ES (video signal)), SI/PSI, etc. from the TS generated by the receiving section 103.

The TS is a multiplexed signal containing a broadcast signal and SI/PSI. For example, the broadcast signal is an MPEG-2 broadcast signal. The broadcast signal is a video ES (elementary streams) and/or an audio ES (elementary stream) obtained by coding video and/or audio. The PSI is information indicating what programs the TS contains and which of the programs each ES contained in the TS belongs to. The SI contains EPG (electronic program guide) information (program information).

The file reading section 105 reads an audio file(s) or a video file(s) from the HDD 101 according to genre information contained in the SI/PSI separated from the TS by the separating section 104 and which of a video ES and an audio ES the broadcast signal separated from the TS by the separating section 104 contains, and inputs it to the signal processing section 106.

The signal processing section 106 generates a video signal and an audio signal by decoding the video ES or audio ES separated by the separating section 104 and the audio file(s) or video file(s) supplied from the file reading section 105. The signal processing section 106 inputs the audio signal and the video signal to the speakers 107 and the monitor 108, respectively.

The speakers 107 are audio output devices for outputting the audio signal that is supplied from the signal processing section 106. The monitor 108 is a display device such as an LCD (liquid crystal display) or a CRT (cathode-ray tube) display for displaying the video signal that is supplied from the signal processing section 106.

The CPU (central processing unit) 109 controls the entire broadcast receiving apparatus 1.

The memory 110 consists of a ROM (read-only memory), RAM (random access memory), and an NVRAM (nonvolatile RAM). The ROM stores programs etc. which are necessary for operation of the CPU 109. The RAM is used, that is, a program, data, etc. are written to it, when the CPU 109 operates. Data stored in the NVRAM can be updated by using a digital broadcast signal.

The remote control signal receiving section 111 receives a manipulation signal that is transmitted from a remote controller 20 wirelessly by infrared light or the like. The remote controller 20 is equipped with various keys that are necessary for manipulation of the broadcast receiving apparatus 1, such as a cursor key, an enter key, and an on/off key.

The on/off key is a key for enabling or disabling a function for playing back a video file(s) or an audio file(s) stored in the HDD 101 (hereinafter referred to as "play back function") when the user listens to or views a broadcast containing only audio or video. Enable/disable switching of the play back function is made every time the user manipulates the on/off key. The play back function is enabled or disabled by using a flag that is located at a prescribed address of the memory 110. Enable/disable switching of the play back function may be made by displaying a GUI menu on the monitor 108 and manipulating it instead of manipulating the on/off key.

The display section 112 displays, on the monitor 108, pictures through which to set genres of video files and audio files stored in the HDD 101. The user sets genres to be correlated with video files and audio files stored in the HDD 101 through the setting pictures displayed on the monitor 108 by the display section 112, by manipulating the remote controller 20.

(Setting Picture)

Figure 4:
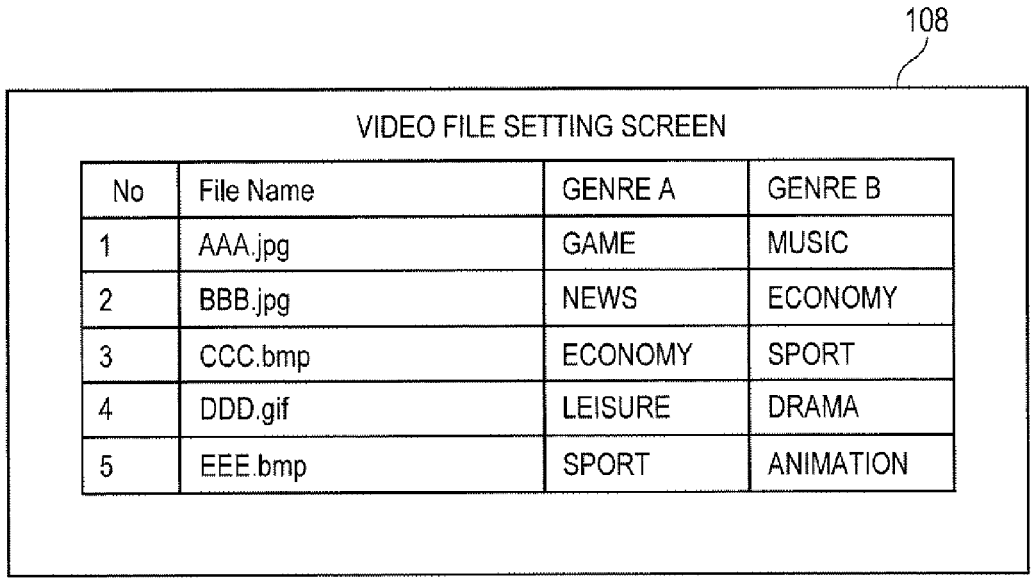
FIG. 4 shows an exemplified setting picture which is displayed on a monitor.
Figure 5:
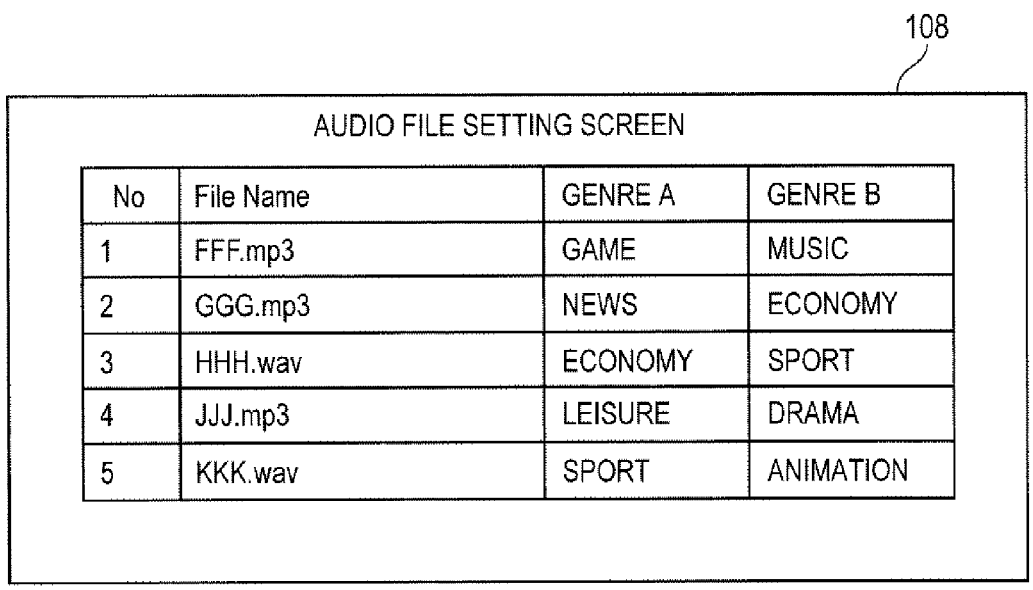
FIG. 5 shows another exemplified setting picture which is displayed on the monitor.

FIGS. 4 and 5 show example setting pictures to be displayed on the monitor 108. FIG. 4 shows a setting screen for the video files. As shown in FIG. 4, the video files stored in the HDD 101 and genres correlated with the respective video files are displayed in the setting screen in list form.

In the example of FIG. 4, each video file can be correlated with two genres. The user sets genres or changes the genres of each video file by manipulating the cursor key and the enter key of the remote controller 20.

FIG. 5 shows a setting screen for the audio files. As in the setting screen for the video files shown in FIG. 4, the audio files stored in the HDD 101 and genres correlated with the respective audio files are displayed in the setting screen in list form. A method for setting genres or changing the genres of each audio file is the same as the method for the video files.

Whereas the examples of FIGS. 4 and 5 are such that each musical file or video file is correlated with genres, it may be stored so as to be correlated with pieces of information that can be acquired from EPG information (program information) such as a time, person who appear, a title, etc. In this case, for example, if video of a certain person who appears (e.g., musician) is being broadcast, a musical file(s) relating to this person is played back.

Where time information is used, each audio file or video file may be correlated with a time slot (e.g., morning, afternoon, or night). In this case, if the viewing time of a broadcast is in the morning, an audio file(s) or video file(s) stored in a folder for morning is played back. An audio file or video file that is correlated with pieces of program information other than genre information, such as a time, persons who appear, a title, etc. (mentioned above), when genre information cannot be acquired.

The terminal 113 is a terminal for connection of a recording medium, which is a USB memory, an SD memory card, or the like. The interface 114 is an interface for data exchange between the CPU 109 and a storage medium connected to the terminal 113.

The user can copy or move a video file, an audio file, or the like from the storage medium connected to the terminal 113 to the HDD 101 by manipulating the remote controller 20. The broadcast receiving apparatus 1 may be configured so that an external storage device such as a DVD recorder or an HDD recorder can be connected to the terminal 113 instead of an USB memory, an SD memory card, or the like.

(Operation of Broadcast Receiving Apparatus 1)

Next, the operation of the broadcast receiving apparatus 1 according to the first embodiment will be described.

Figure 6:
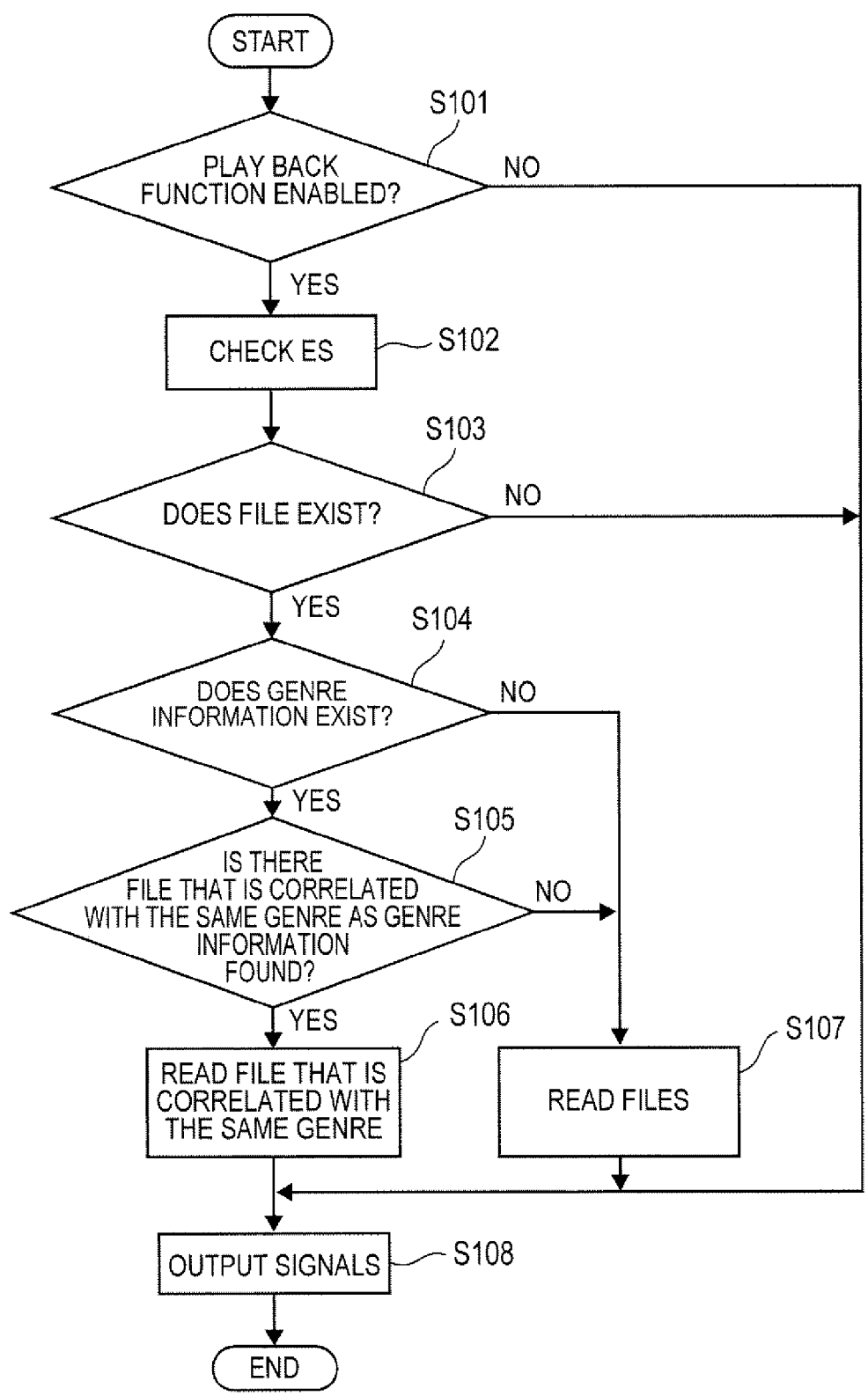
FIG. 6 is a flowchart showing an exemplified process which is executed by the broadcast receiving apparatus according to the first embodiment.

FIG. 6 is a flowchart showing an example process which is executed by the broadcast receiving apparatus 1.

As soon as the user powers on the broadcast receiving apparatus 1, the receiving section 103 tunes in to a desired channel to select a corresponding digital broadcast signal received by the antenna 102 and generates a TS (transport stream) by demodulating the selected digital broadcast signal.

The separating section 104 separates a broadcast signal (audio ES or video ES), SI/PSI, etc. from the TS generated by the receiving section 103. At step S101, the file reading section 105 checks, from a flag state in the memory 110, whether the play back function is enabled.

If the play back function is enabled (S101: yes), at step S102 the file reading section 105 checks whether the broadcast signal separated from the TS by the separating section 104 contains only a video ES or an audio ES.

If the broadcast signal contains only a video ES, at step S103 the file reading section 105 checks whether an audio file(s) is stored in the HDD 101. If the broadcast signal contains only an audio ES, at step S103 the file reading section 105 checks whether a video file(s) is stored in the HDD 101.

If a file(s) exists (S103: yes), at step S104 the file reading section 105 checks whether the SI/PSI separated by the separating section 104 contains genre information.

If the SI/PSI contains genre information (S104: yes), at step S105 the file reading section 105 checks whether a file(s) that is correlated with the same genre as the genre of that genre information is stored in the HDD 101. At this time, if the broadcast signal contains only a video ES, the file reading section 105 checks whether an audio file(s) that is correlated with the same genre is stored in the HDD 101. If the broadcast signal contains only an audio ES, the file reading section 105 checks whether a video file(s) that is correlated with the same genre is stored in the HDD 101.

If there exists a file(s) that is correlated with the same genre (S105: yes), at step S106 the file reading section 105 reads a file(s) that is correlated with the same genre from the HDD 101 and inputs it to the signal processing section 106.

If there exists no genre information (S104: no) or if there exists no file that is correlated with the same genre (S105: no), at step S107 the file reading section 105 reads the files stored in the HDD 101 irrespective of the genres. At this time, when the video files are to be read out, they are read from folders A, B, and C in this order. When the audio files are to be read out, they are read from folders D, E, and F in this order.

At step S106 or S107, if the broadcast signal contains only a video ES, the file reading section 105 reads only an audio file(s) from the HDD 101. If the broadcast signal contains only an audio ES, the file reading section 105 reads only a video file(s) from the HDD 101.

If plural video files or audio files exist, the plural files are read out sequentially at prescribed time intervals and input to the signal processing section 106. The plural files may be read out either in the same order as were stored in the HDD 101 or randomly. As a further alternative, the plural files may be read out in priority order that was set by the user.

The signal processing section 106 decodes the broadcast signal separated by the separating section 104 and the file(s) supplied from the file reading section 105 and inputs the resulting audio signal and video signal to the speakers 107 and the monitor 108, respectively.

If the broadcast signal contains only a video ES, an audio signal obtained by decoding the audio file(s) read from the HDD 101 is input to the speakers 107. Furthermore, a video signal obtained by decoding the video ES of the broadcast signal is input to the monitor 108.

If the broadcast signal contains only an audio ES, an audio signal obtained by decoding the audio ES of the broadcast signal is input to the speakers 107. Furthermore, a video signal obtained by decoding the video file(s) read from the HDD 101 is input to the monitor 108.

If the play back function is disabled (S101: no) or no video file or audio file is stored in the HDD 101 (S103: no), only the audio ES or the video ES of the broadcast signal is decoded and input to the speakers 107 or the monitor 108.

As described above, in the broadcast receiving apparatus according to the first embodiment, if the broadcast signal of a received digital broadcast signal contains only an audio ES, video is played back on the basis of a video file(s) stored in the HDD 101. If the broadcast signal of a received digital broadcast signal contains only a video ES, audio is played back on the basis of an audio file(s) stored in the HDD 101. Therefore, when the user view or listens to a broadcast containing only video or audio, audio or video can also be presented to the user and the convenience is thus increased.

Since a video file(s) or an audio file(s) corresponding to the genre of a broadcast program is read out and video or audio is played back on the basis of the read-out video file(s) or audio file(s), it is unlikely that the played-back video or audio impairs the atmosphere of the program. Furthermore, since the user can set a relationship between an audio file and a video file, presented video and audio can reflect the tastes of the user.

Other Embodiments

The invention is not limited to the above embodiment itself and, in the practice stage, may be embodied in such a manner that constituent elements are modified without departing from the spirit and scope of the invention. For example, the remote controller 20 may be provided with a cancel key for disabling the play back function during viewing of a broadcast of only video or listening of a broadcast of only audio. And various inventions can be conceived by properly combining plural constituent elements disclosed in the embodiment. For example, several ones of the constituent elements of the embodiment may be omitted. Furthermore, constituent elements of different embodiments may be combined as appropriate.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A broadcast receiving apparatus comprising:
a receiving module configured to receive a broadcast signal;
a storage module configured to store an audio file and a video file;
a reading module configured to determine whether the broadcast signal received by the receiving module is an audio signal or a video signal, to read the video file from the storage module if the broadcast signal is the audio signal, and to read the audio file from the storage module if the broadcast signal is the video signal; and
a playing back module configured to play back audio and video on the basis of the broadcast signal and the file read by the reading module.

2. The broadcast receiving apparatus according to claim 1, wherein the audio files and the video files are stored in the storage module associated with a piece of program information; and
the reading module acquires program information of a broadcast program from the broadcast signal, and reads a video file or an audio file that is associated with the program information identical with the acquired program information.

3. The broadcast receiving apparatus according to claim 1, further comprising a speaker configured to output the audio and a display module configured to display the video.

4. The broadcast receiving apparatus according to claim 3, further comprising an instruction accepting module configured to accept an instruction signal for correlating the audio file or the video file stored in the storage module with program information;
wherein the display module displays a setting screen for the correlating.

5. A broadcast receiving method comprising:
receiving a broadcast signal;
determining whether the broadcast signal is an audio signal or a video signal, to read a video file from a storage module if the broadcast signal is the audio signal, the storage module in which an audio file and the video file are stored, and to read the audio file from the storage module if the broadcast signal is the video signal; and
playing back audio and video on the basis of the received broadcast signal and the file read by a reading module.

* * * * *